United States Patent [19]

Saint Martin

[11] Patent Number: 4,747,218

[45] Date of Patent: May 31, 1988

[54] LIMITING OF CORROSION IN MACHINE FOR REFLOW SOLDERING IN VAPOR PHASE

[75] Inventor: Xavier Saint Martin, Plaisir, France

[73] Assignee: Compagnie d'Informatique Militaire Spatial et Aeronautique, Paris, France

[21] Appl. No.: 946,570

[22] PCT Filed: Apr. 2, 1986

[86] PCT No.: PCT/FR86/00111

§ 371 Date: Dec. 2, 1986

§ 102(e) Date: Dec. 2, 1986

[30] Foreign Application Priority Data

Apr. 2, 1985 [FR] France .............................. 85 05011

[51] Int. Cl.[4] ..................... F26B 11/18; F27B 15/00
[52] U.S. Cl. ................................. 34/73; 432/197; 432/210; 34/36; 134/31
[58] Field of Search ............ 432/194, 197, 210, 90, 432/91; 34/68, 73, 78, 36; 134/11, 31, 60

[56] References Cited

U.S. PATENT DOCUMENTS

| | | | |
|---|---|---|---|
| 3,947,240 | 3/1976 | Pfahl, Jr. ........................... | 432/210 |
| 4,090,843 | 5/1978 | Chu et al. ........................... | 432/197 |
| 4,135,803 | 1/1979 | Van Houwelington .............. | 34/36 |
| 4,261,111 | 4/1981 | Rand ................................ | 34/73 |
| 4,453,916 | 6/1984 | Osipov et al. ...................... | 432/197 |
| 4,466,198 | 8/1984 | Doll ................................. | 34/73 |
| 4,628,616 | 12/1986 | Shirai et al. ....................... | 432/194 |
| 4,642,904 | 2/1987 | Smith, Jr. .......................... | 34/35 |

Primary Examiner—Henry C. Yuen
Attorney, Agent, or Firm—Pollock, VandeSande & Priddy

[57] ABSTRACT

The main object of the invention is the limiting of corrosion in vapor-phase reflow soldering machines. Liquid chlorine and fluorine are used in the device for soldering in vapor phase. The decomposition of these elements by heat releases ions which, when brought in the presence of water, form hydrofluoric acid and hydrochloric acid. These acids corrode the tank through which the soldering method is used as well as the metallic elements of the soldered components. The device which is the object of the present invention eliminates water from the secondary liquid by isolating the vapors of these liquids from the atmosphere, preventing water from penetrating into the water-removal cartridge and providing for the water-removal process before fresh secondary liquid is brought into use. The invention applies mainly to reflow soldering in vapor phase.

8 Claims, 3 Drawing Sheets

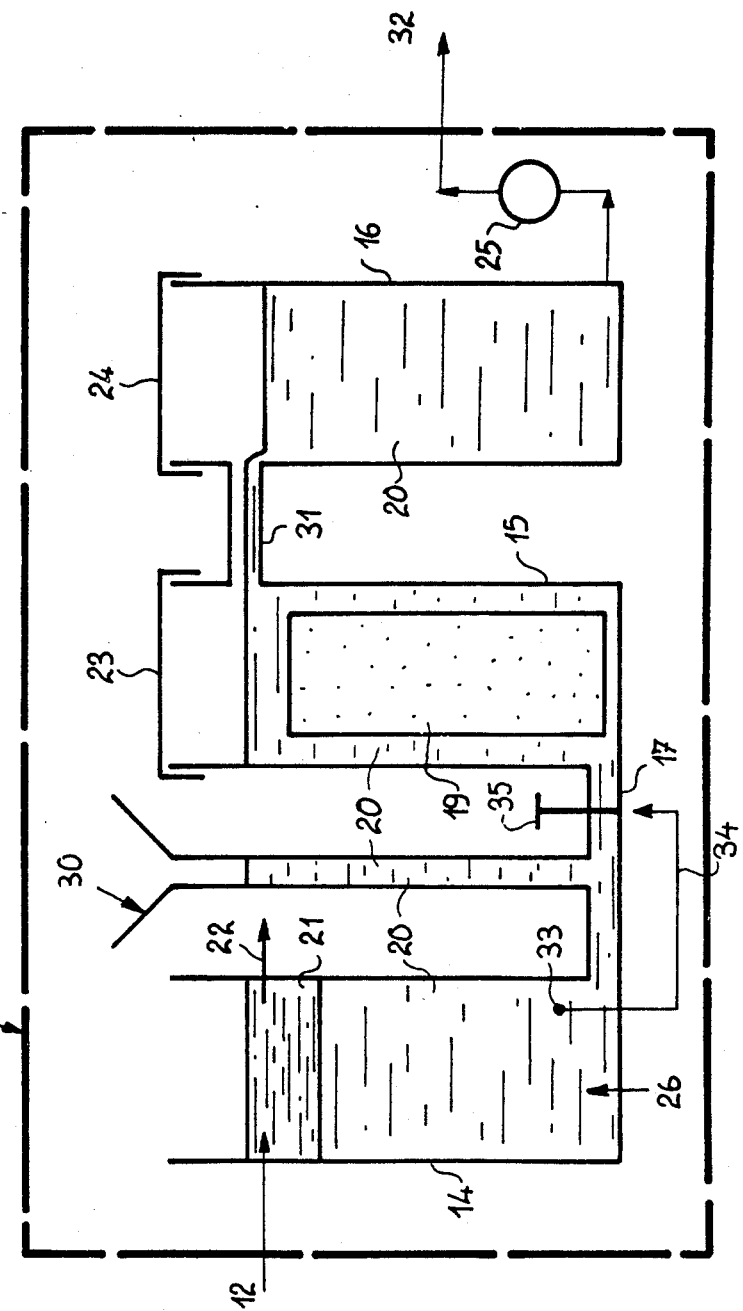

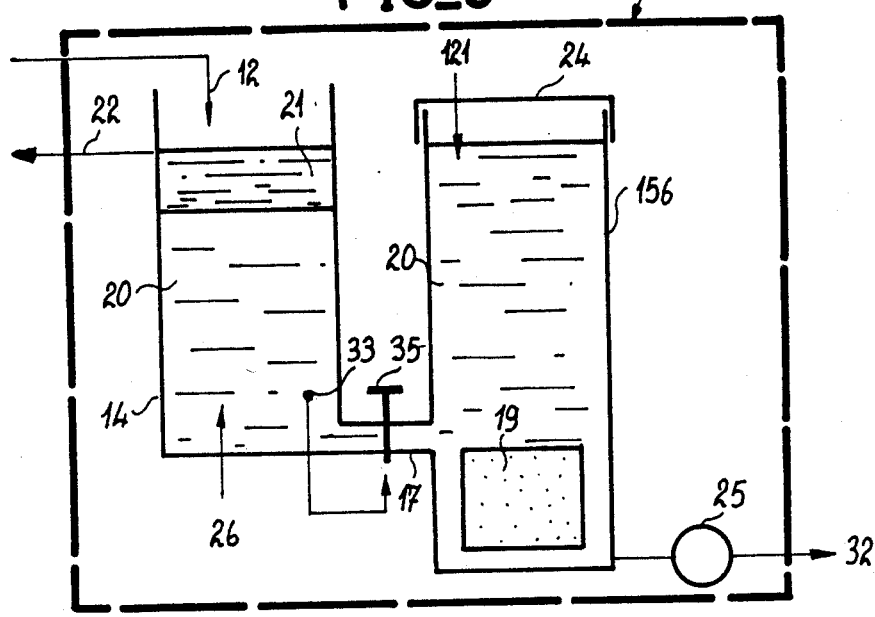
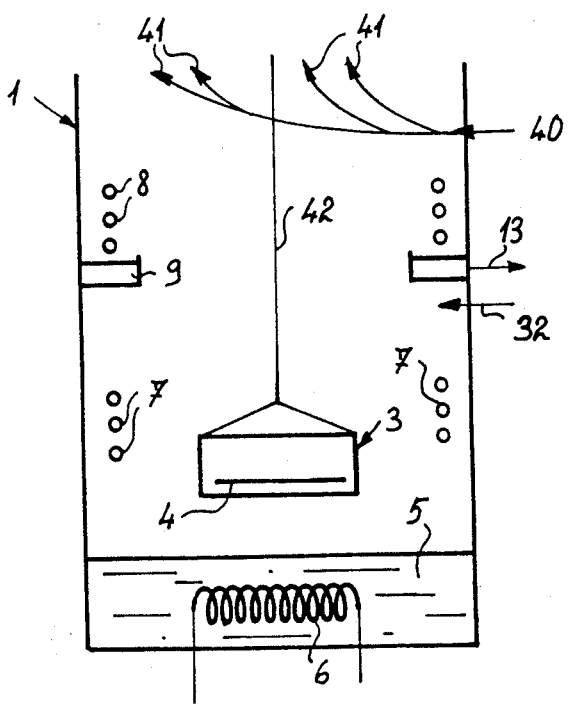

LIMITING OF CORROSION IN MACHINE FOR REFLOW SOLDERING IN VAPOR PHASE

The main object of the invention is the limiting of corrosion in a vapor phase reflow soldering machine.

BACKGROUND OF THE INVENTION

The increasing number of connections to be welded on electronic cards and, especially, the development of electronic cards produced in small batches have promoted the development of machines for reflow soldering in vapor phase. When soldering in vapor phase, the solder metal is deposited, in an initial stage, in the form of paste or solid solder preform. The soldering as such is performed in a second stage by the addition of heat. The heat is obtained by the condensation of primary liquid on the component. The primary liquid is heated to its boiling point which is above the melting point of the solder, so as to obtain a zone of saturated vapor. At atmospheric pressure, the temperature of the saturated vapor zone is the same as the boiling temperature of the liquid. Since the entire surface of the object to be soldered is in contact with the vapor, this vapor is heated uniformly and provides for the simultaneous soldering of all the connections that have to be made.

The part or component to be welded is plunged in a primary vapor zone. This vapor condenses upon contact with the part, thus providing for the addition of heat and for the melting of the previously deposited solder.

With a view to reducing losses of primary liquid through convection, diffusion or leakage, a secondary vapor zone forming a barrier is created, using a liquid which is often of greater density and lower boiling temperature and is less costly.

A liquid frequently used as a primary liquid is, for example, the one marketed by the 3M Company under the brand name "Fluorinert" with the reference FC 70. The secondary liquid used may be, for example, trifluorotrichloroethane with the formular $CFCl_2$—$CClF_2$. The method of vapor phase soldering uses liquids containing fluorine which are heated to high temperatures, for example 215° C. At these temperatures, the primary and secondary liquids tend to decompose partially, the secondary liquid releasing $Cl^-$ and $F^-$ ions. The presence of these ions will cause two types of corrosion: firstly, a dry corrosion through the formation of the chloride and fluoride of the affected metals, and secondly an aqueous corrosion through the formation of acid in the presence of water. The presence of chlorine and fluorine ions has two consequences: firstly the corrosion of the vapor phase soldering machine, and secondly the presence of ions on the soldered parts, possibly leading to corrosion.

BRIEF DESCRIPTION OF THE INVENTION

The device according to the present invention proposes the complete elimination of water from the secondary liquid and, thereby, the elimination of the acid corrosion due to this liquid.

The main object of the present invention is a machine for reflow soldering in vapor phase, comprising a tank which contains a boiling primary liquid and a vaporized secondary liquid. The machine is designed to limit the losses of primary liquid, and also includes means for washing the secondary liquid and means for removing water from the secondary liquid as well as a storage vessel containing secondary liquid, and means for hermetically sealing the washing means from the water-removal means.

BRIEF DESCRIPTION OF THE DRAWINGS

The invention will be better understood from the following drawings with the appended figures which are given as non-exhaustive examples. Of these figures:

FIG. 2 is a diagram of an initial alternative mode or embodiment of the device for regenerating the secondary liquid according to the invention;

FIG. 3 is a diagram of a second mode or embodiment of the device for regenerating the secondary liquid according to the invention;

FIG. 4 is a diagram of a device for soldering under vapor phase according to the invention.

FIGS. 1 to 4 use the same references to designate the same elements.

DETAILED DESCRIPTION OF THE INVENTION

Figure 1:
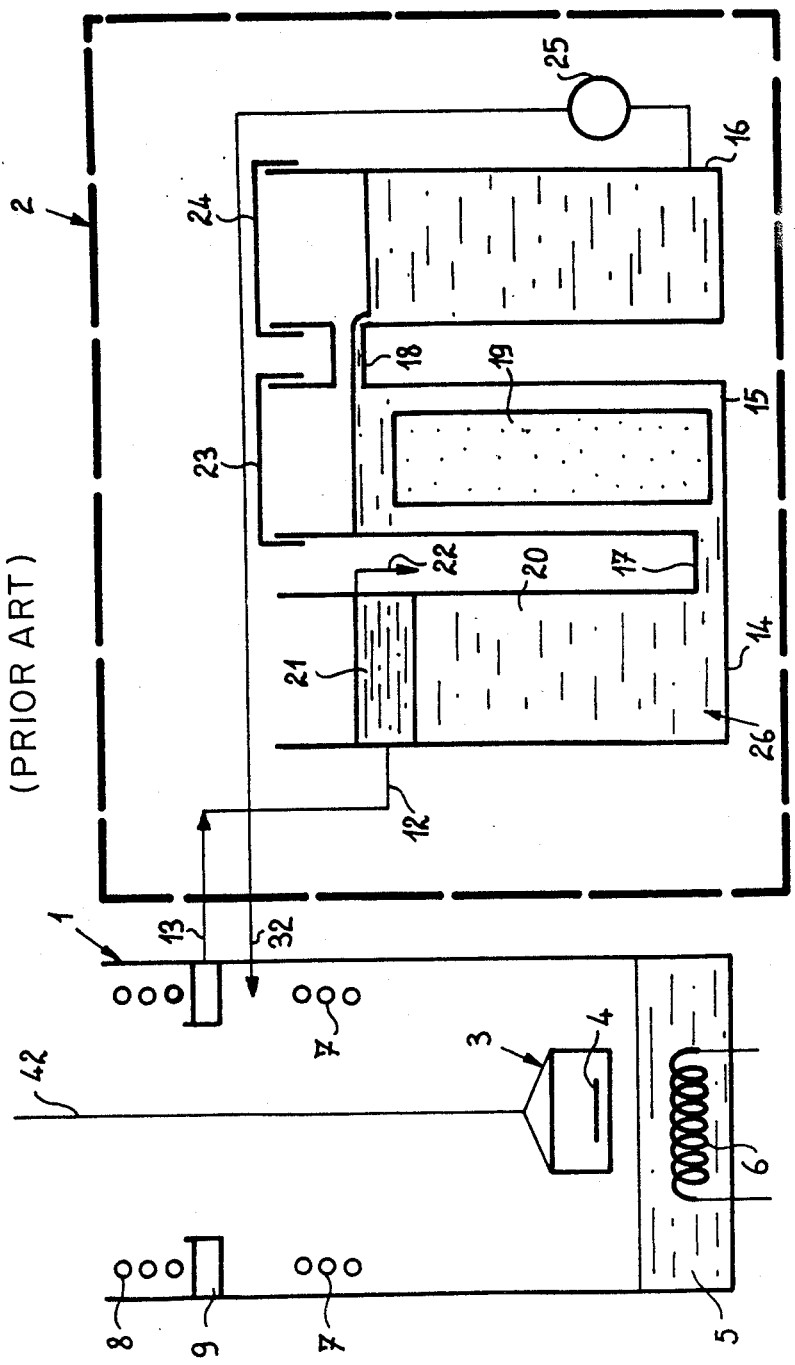
FIG. 1 is a diagram of a device according to the prior art.

FIG. 1 depicts a vapor phase soldering device according to the prior art. This device comprises a tank 1, at the bottom of which is the primary liquid 5. The liquid 5 is heated to boiling point by heating means 6. A boat 3 containing the electronic cards 4, to which it is desired to solder components, is let down by means of a cable 42 into the primary vapor zone. The primary liquid 5 condenses on a refrigerated coil 7. The liquid 5 falls to the bottom of the tank 1. To economize the primary liquid, a secondary liquid 20 is injected into the tank by a pipe 32. The secondary liquid 20 also provides for the pre-heating of the cards 4 which it is desired to solder. The secondary liquid 20 condenses on a refrigerated coil 8 and is collected by a gutter 9. The secondary liquid 20 is removed from the tank 1 by a pipe 13. The secondary liquid 20 is introduced into a washing and water-removal device 2 by an inlet 12. The device 2 comprises a washing tank 14 containing water 21. The secondary liquid 20 is heavier than water (or has a higher density than water) thus the water 21 floats on the secondary liquid 20 in the washing tank 14. The inlet 12 of the pipe 13 which conveys the secondary liquid 20 communicates with tank 14 within a region occupied by the water 21 in order to make the secondary liquid bubble through the water. A clean-water feeding unit 26 is provided for at the bottom of the washing tank 14. Being less dense than the secondary liquid 20, the water 21 rises to the surface. A waste-water discharging system 22 is provided for at the maximum level reached by the water. The washing tank 14 is linked by a pipe 17 to a water-removal tank 15. The pipe 17 is placed at the level of the bottom of the washing tank 14 and/or the water-removal tank 15. The water-removal tank 15 comprises a cartridge 19 for the elimination of water. The cartridge 19 contains, for example, porous silica. The tank 15 is provided with a lid 23 which limits the evaporation of the liquid 20. The water-removal tank 15 is linked by a tube 18 to a storage vessel 16 of secondary liquid 20. The storage vessel 16 is provided with a lid 24 which limits the evaporation of secondary liquid 20. Pumping means 25 are used to reinject the secondary liquid 20 into the tank 1 through the pipe 32.

The device of FIG. 1 undergoes rapid corrosion owing to the presence of water in the secondary liquid. Water may be introduced into the secondary liquid 20 in three ways: firstly, in normal operation, from the steam present in the ambient air; secondly, during the replacement of the secondary liquid 20 or when the storage vessel 16 is levelled up by fresh secondary liquid containing water; thirdly, in the event of an accident which entails the risk that the water 21 of the washing tank 14 might flow into the water-removal tank 15 and thus saturate the water-removal cartridge 19 before flowing into the storage vessel 16.

The device which is the object of the present invention is used to eliminate water from the secondary liquid 20.

FIG. 2 depicts an initial embodiment of the device 2 according to the invention for washing the secondary liquid 20 and removing water from it. The device 2 of FIG. 2 especially comprises elements of the device 2 of FIG. 1.

In the event of a prolonged stoppage of the vapor phase reflow soldering machine, the water 21 contained in the washing tank 14 and the secondary liquid 20 contained in the water-removal tank 15 and in the storage vessel 16 evaporate. The secondary liquid 20 is far more volatile than the water 21. As and when the secondary liquid 20 evaporates from the water-removal tank 15, it is replaced by the liquid 20 coming from the tank 14 which communicates with it through the pipe 17. If the evaporation continues, the water 21 flows from the tank 14 into the tank 15, saturating the water-removal cartridge 19. In restarting the machine, the secondary liquid 20 is added into the storage vessel 16. Thus, with the water-removal cartridge 19 being saturated, the water dissolved in the secondary liquid 20 is no longer eliminated. Thus, acid corrosion is obtained.

The device according to the invention comprises means 35 for the hermetic sealing of the washing tank 14 and the water-removal tank 15. The hermetic sealing means 35 comprise, for example, a cock or a solenoid valve. In the event of a prolonged stoppage of the machine, the shutting of the cock 35 prevents the water 21 from pentrating into the tank 15.

The device according to the invention advantageously comprises a water level detector 33 placed in the tank 14. In the event of a fall in the level of the water 21 in the tank 14, the detector 33 actuates the shutting of the solenoid valve 35 by means of a line 34.

In the device of the prior art, the secondary liquid 20 was added to the storage vessel 16 as and when it evaporated. The fresh secondary liquid 20 containing water was not rid of water before being sent into the tank 1 of FIG. 1.

The device according to the invention advantageously comprises filling means 30 by which secondary liquid 20 can be added before the point at which it flows into the water-removal tank 15. The filling means 30 are, for example, fixed to the pipe 17. Thus, the fresh secondary liquid 20 is rid of dissolved water before being sent by the pump 25 through the pipe 32 to the tank 1 of FIG. 1.

FIG. 3 depicts an alternative mode of emobidment or the device 2 according to the invention. The device for washing the secondary liquid 20 and removing water from it, illustrated in FIG. 3, comprises a washing tank 14 as well as a storage vessel 156 which contains a water-removal cartridge 19. The means for hermetic sealing between the washing tank 14 and the storage vessel 156 are arranged on the pipe 17 which links them up. The water-removal cartridge 19 is arranged, for example, at the bottom of the storage vessel 156, below the bottom level of the washing tank 14. Thus, both the liquid 20 coming from the tank 14 as well as the fresh secondary liquid 20 added to the tank 156 are rid of water by the cartridge 19 before being sent by the pumping means 25 through the pipe 32 to the tank 1 of FIG. 1. In one example of an embodiment of the device according to the invention, the inlet 12 of the pipe 13 ends above the water 21, thus enhancing the efficiency with which the secondary liquid 20 is washed.

FIG. 4 depicts an alternative mode or embodiment of the tank 1 according to the invention. In addition to the devices which comprised the tank 1 of FIG. 1, the tank according to the invention comprises means 40 for the injection of a gas 41 which does not react chemically with the primary liquid 5 and the secondary liquid 20. The gas 41 prevents the formation of acid by preventing the water vapor present in the atmosphere from penetrating into the tank 1. Furthermore, by isolating the vapors and secondary liquid 20 from the atmosphere, the gas 41 diminishes the consumption of secondary liquid 20.

The gas 41 is, for example, nitrogen or dried air.

The method used for soldering, for example, electronic components on a printed circuit comprises the following steps:

Starting up the vapor-phase reflow soldering machine according to the invention;

Depositing the solder, for example, in the form of paste, at the positions of the desired connections by using, for example, a stencil;

Placing the components to be welded on the printed circuit;

Placing the printed circuit in a boat 3;

Bringing the boat down into the part of the tank 1 which has a saturated vapor zone of primary liquid 5;

Raising the boat 3 carrying the printed circuit to which the components are soldered.

Advantageously, once the vapor-phase reflow soldering machine is in operation, several cards are soldered.

As and when it condenses on the coil 8, the secondary liquid 20 is washed and rid of water to be used again in the machine according to the invention.

The device and the method for reflow soldering in vapor phase can be used to limit corrosion in machines, components and soldered circuits, the useful life of which is thus extended. Limiting the corrosion of soldered components is all the more important as vapor-phase reflow soldering is currently used for high-technology devices which are very difficult to reach once assembled. For example, the vapor-phase reflow soldering method is used for electronic equipment for satellites.

The invention applies mainly to soldering in vapor phase.

What is claimed is:

1. A machine for reflow soldering in vapor phase comprising a tank containing a primary liquid at boiling point and a vaporized secondary liquid, designed to limit losses of primary liquid, said machine further including washing means for washing said secondary liquid, water-removal means for removing water from the secondary liquid, a storage vessel for secondary liquid fed from the water-removal means, a fluid coupling between said washing means and said water-removal means, valve means for hermetic sealing of the fluid coupling for sealing said washing means from said water-removal means, and a water level detector associated with said washing means and means for controlling said valve means coupled to said water level detector.

2. A machine according to claim 1 comprising means for filling secondary liquid, located upstream of the water-removal means.

3. A machine according to claim 2, wherein the secondary liquid filling means is placed to communicate with a conduit which links the washing means to the water-removal means.

4. A machine as recited in claim 2, wherein the secondary liquid storage vessel contains the water-removal means.

5. A machine as recited in claim 2, further comprising means for the introduction of a gas which does not react with the secondary liquid.

6. A machine according to claim 5, wherein the gas introduced is nitrogen.

7. A machine according to claim 5, wherein the gas introduced is dried air.

8. A method of limiting losses of a primary liquid in a vapor reflow soldering machine, said method comprising the steps of:

providing a source of a secondary liquid to be injected into a solder reflow region to protect against evaporative losses of said primary liquid, said secondary liquid having a density different from water, collecting secondary liquid condensed on a periphery of a said solder reflow region, conducting said collected secondary liquid to a first tank to separate said secondary liquid from water contained therein, extracting secondary liquid from said first tank and passing said extracted secondary liquid through a valved conduit, receiving said secondary liquid from said valved conduit in a water removal region, removing water from said secondary liquid in said water removal region, detecting a water level in said first tank at or below a predetermined level, and closing said valved conduit in response to said detecting step.

* * * * *